United States Patent
Delbridge et al.

(10) Patent No.: US 12,039,576 B2
(45) Date of Patent: Jul. 16, 2024

(54) METHOD AND SYSTEM FOR CAMPAIGN MESSAGE CLASSIFICATION

(71) Applicant: Klaviyo Inc., Boston, MA (US)

(72) Inventors: Ian Delbridge, Boston, MA (US); Sofiane Hadji, Boston, MA (US); Gal Korcia, Boston, MA (US); Charlie Natoli, Boston, MA (US)

(73) Assignee: Klaviyo Inc., Boston, MA (US)

( * ) Notice: Subject to any disclaimer, the term of this patent is extended or adjusted under 35 U.S.C. 154(b) by 0 days.

(21) Appl. No.: 17/951,086

(22) Filed: Sep. 22, 2022

(65) Prior Publication Data

US 2024/0037599 A1     Feb. 1, 2024

Related U.S. Application Data

(60) Provisional application No. 63/393,914, filed on Jul. 31, 2022.

(51) Int. Cl.
| | |
|---|---|
| *G06Q 30/0241* | (2023.01) |
| *G06Q 30/0242* | (2023.01) |
| *G06Q 30/0251* | (2023.01) |

(52) U.S. Cl.
CPC ..... *G06Q 30/0276* (2013.01); *G06Q 30/0243* (2013.01); *G06Q 30/0244* (2013.01); *G06Q 30/0267* (2013.01); *G06Q 30/0277* (2013.01)

(58) Field of Classification Search
CPC ........................ G06Q 30/0243; G06Q 30/0244
USPC .............................................. 705/14.42, 14.43
See application file for complete search history.

(56) References Cited

U.S. PATENT DOCUMENTS

| | | | |
|---|---|---|---|
| 6,845,273 B1* | 1/2005 | Taylor | G06F 40/10 |
| | | | 700/1 |
| 8,364,467 B1 | 1/2013 | Bowman et al. | |
| 9,645,710 B2 | 5/2017 | Coe et al. | |
| 10,803,479 B2 | 10/2020 | Brigham et al. | |
| 11,301,632 B2 | 4/2022 | Terry et al. | |
| 11,316,808 B1* | 4/2022 | Eidelman | H04L 51/52 |
| 11,392,847 B1* | 7/2022 | Abdollahian | G06N 20/00 |
| 2011/0055012 A1 | 3/2011 | Christianson et al. | |
| 2011/0246201 A1 | 10/2011 | Hawit | |
| 2012/0245925 A1 | 9/2012 | Guha et al. | |
| 2014/0279745 A1* | 9/2014 | Esponda | G06N 5/043 |
| | | | 706/12 |
| 2015/0006295 A1 | 1/2015 | Liu et al. | |

(Continued)

OTHER PUBLICATIONS

Dewey Decimal Classification, Encyclopedia Britannica [online], downloaded Apr. 21, 2023 from https://www.britannica.com/science/Dewey-Decimal-Classification (Year: 2023).*

(Continued)

*Primary Examiner* — Alexandru Cirnu

(74) *Attorney, Agent, or Firm* — Brian Short; Richard Batt

(57) ABSTRACT

Methods and systems for improved and efficient campaign message classification are disclosed. By automating the campaign message classification process, the system can improve efficiency in categorizing and managing campaign messages. The system can predict a message's type or characteristics via an ensemble model that comprises one or more logic-rule model(s) and machine learning language model(s). The ensemble model can process various data and predict a message's type or characteristics based on an aggregated prediction mechanism.

20 Claims, 11 Drawing Sheets

(56) References Cited

U.S. PATENT DOCUMENTS

| | | | |
|---|---|---|---|
| 2015/0066654 | A1 | 3/2015 | Kannan et al. |
| 2016/0162456 | A1* | 6/2016 | Munro .............. G06F 16/24532 704/9 |
| 2016/0210003 | A1 | 7/2016 | Coe |
| 2016/0217500 | A1 | 7/2016 | Brigham |
| 2018/0114253 | A1 | 4/2018 | Kakarlapudi et al. |
| 2018/0373696 | A1 | 12/2018 | Terry et al. |
| 2021/0375262 | A1* | 12/2021 | Wick .................... G10L 15/063 |

OTHER PUBLICATIONS

Mumford, Tracy, Remember card catalogs?, MPR News [online], dated Mar. 10, 2015, retrieved from https://www.mprnews.org/story/2015/03/10/books-card-catalog-art on Apr. 21, 2023 (Year: 2015).*

Niesler, T.R., et al., A variable-length category-based n-gram language model, 1996 IEEE International Conference on Acoustics, Speech, and Signal Processing Conference Proceedings, Aug. 6, 2002, retrieved from https://ieeexplore.ieee.org on Apr. 21, 2023, DOI: 10.1109/ICASSP.1996.540316 (Year: 2002).*

Joshi, Prateek, spaCy Tutorial to Learn and Master Natural Language Processing (NLP), retrieved Apr. 26, 2023 from Analytics Vidhya [online] at https://www.analyticsvidhya.com/blog/2020/03/spacy-tutorial-learn-natural-language-processing/ and dated as "Last Modified on Jun. 25, 2020" (Year: 2020).*

Kotsiantis et al., Machine learning: A review of classification and combining techniques, Artificial Intelligence Review, Nov. 2006, 26(3):159-190, DOI:10.1007/s10462-007-9052-3, retrieved online on Oct. 16, 2023 (Year: 2006).*

Campaign Monitor, "10 Examples of Using Email for Lifecycle Marketing", retrieving from http://www.campaignmonitor.com/blog/email-marketing/10-examples-using-email-for-lifecycle-marketing/, available on Jun. 25, 2019 (2019).

G. Campaign Monitor, "10 Examples of Using Email for Lifecycle Marketing", retrieved from https://www.campaignmonitor.com/blog/email-marketing/10-examples-using-email-for-lifecycle-marketing/, available on Jun. 25, 2019 (Year: 2019).

* cited by examiner

370

318
| | |
|---|---|
| Type | Link |
| Width | w |
| Height | x |
| Top | y |
| Left | z |
| Visible | True |
| Text | BLAVIC |

320
| | |
|---|---|
| Type | Image |
| Width | w |
| Height | x |
| Top | y |
| Left | z |
| Visible | True |
| Text | HAPPY NEW YEAR |

322
| | |
|---|---|
| Type | Text |
| Width | w |
| Height | x |
| Top | y |
| Left | z |
| Visible | True |
| Text | Ship Free |

*FIG. 3C*

METHOD AND SYSTEM FOR CAMPAIGN MESSAGE CLASSIFICATION

CROSS-REFERENCES TO RELATED APPLICATIONS

This application claims the benefit of U.S. Provisional Patent Application No. 63/393,914, entitled "METHOD AND SYSTEM FOR EXEMPLARY CAMPAIGN MESSAGE CLASSIFICATION, GENERATION AND MANAGEMENT," filed Jul. 31, 2022, which is incorporated herein by reference for all purposes.

TECHNICAL FIELD

The present subject matter relates to systems and methods for data integration and management of electronic messages. More specifically, the present subject matter relates to data classification in the context of computer-aided management of electronic messages.

BACKGROUND

Digital marketing campaign has become a powerful way to promote a business's products and services to its customers. It helps the customers to be aware of the business's latest offerings. Among digital marketing's various tools, computer-compiled campaign messages such as emails and mobile text messages can directly deliver the most relevant content to a customer.

Various providers have used message examples to motivate business marketers, such as ReallyGoodEmails or Milled. However, their selections of message examples are limited. For example, some examples are selected based on manual reviews and voluntary user submissions, which are time-consuming and low efficient; some examples lack a standardized selection process with quality control. Furthermore, these examples often are not diverse enough to offer a tailored experience for a specific business marketer.

As such, there are a lot of areas for improving the computing system performance in the classification, generation, and management of campaign messages via an improved approach.

SUMMARY OF THE INVENTION

The present subject matter describes improved methods for automated campaign message classification via a computer network. In order to select and manage various types of representative campaign messages, the system can predict a campaign message's type via an ensemble model with diverse base models, such as a logic-rule model and/or one or more language models. The ensemble model can process the content data, layout data and metadata to predict a message's type based on an aggregated prediction result.

In addition to the campaign type classification, the ensemble model can be trained for message characteristic classification, such as campaign channels, campaign generator attributes, design quality, targeting level, holiday theme, etc. For example, the ensemble model can be trained with labeled training data for identifying messages with high-quality design elements so that it can identify and tag messages with good designs. Similarly, the ensemble model can be trained to automatically tag messages with a specific holiday theme.

Via the automated classification process, the system can generate a browsable collection of diverse, high-performing campaign messages, e.g., emails and SMS messages, which can prompt a user or a prospective campaign generator to create quality content for his/her own campaigns. Furthermore, various types of campaigns can be shown to users in response to his/her unique needs or expressed interests.

A computer implementation of the present subject matter comprises: receiving, at a campaign management server, a campaign message, retrieving metadata associated with the campaign message, generating a plurality of message components with respective content data and layout data, and determining a first campaign type based on the plurality of message components and the metadata using a logic-rule model, determining a second campaign type based on the plurality of message components and the metadata using a first language model, determining a third campaign type based on the plurality of message components and the metadata using a second language model, and selecting a campaign type from the first, second and third campaign types based on a majority prediction. According to some embodiments, the metadata comprises at least one subject line and the campaign name of the campaign message.

Furthermore, the method can further comprise: generating, using a scraper model and an extraction model, the respective layout data and content data of the message components during a scraping and preprocessing process. According to some embodiments, the scraper model can identify the various message components, such as text components, image components and link components; the extraction model can render the HTML and extract the content data and layout data, such as the text, size, location and visibility of the respective message components.

According to some embodiments, the logic-rule model can determine the first campaign type based on a number of predetermined logic rules, and the logic-rule model can further comprise a data labeling model, e.g., the snorkel model, to assign respective weights to the predetermined logic rules.

According to some embodiments, the first language model is a transformer encoder model, and the second language model is a N-gram model. According to some embodiments, the method can further comprise: converting the message components and the metadata into a series of textual representations and conducting feature extraction based on the series of textual representations to generate feature vectors using the transformer encoder model and the N-gram model, which can be further associated with a classifier model such as a Support Vector Machine model for determining the second campaign type and the third campaign type.

According to some embodiments, the method can further comprise: when each of the first campaign type, the second campaign type, and the third campaign type is different from each other, selecting a default model from the logic-rule model, the first language model and the second language model and selecting the campaign type from the default model for the campaign message. According to some embodiments, when each of the predicted campaign types is different, the system can abstain from selecting a majority campaign type.

According to some embodiments, the method can further comprise: selecting, for each of a number of campaign types, campaign messages associated with performance metrics higher than a predetermined threshold and displaying the campaign messages to a prospective campaign generator.

Another computer implementation of the present subject matter comprises: receiving, at a campaign management server, a campaign message, retrieving metadata associated with the campaign message, wherein the metadata comprises at least one subject line and campaign name of the campaign message, generating a plurality of message components with respective content data and layout data, and determining a majority campaign type based on the plurality of message components and the metadata using an ensemble model, wherein the ensemble model comprises one or more of a logic-rule model, a first language model, and a second language model configured to independently generate a respective campaign type.

According to some embodiments, the method can further comprise generating, using a scraper model and an extraction model, the respective layout data and content data of the message components. The scraper model can identify the various message components, such as text components, image components and link components; the extraction model can render the HTML and extract the content data and layout data, such as the text, size, location and visibility of the respective message components.

According to some embodiments, the method can further comprise determining that the ensemble model does not produce the majority campaign type, and selecting a default model for generating the majority campaign type.

Another computer implementation of the present subject matter comprises: receiving, at a campaign management server, a campaign message, retrieving metadata associated with the campaign message, wherein the metadata comprises at least one subject line and campaign name of the campaign message, generating a plurality of message components with respective content data and layout data, and determining a campaign type based on the plurality of message components and the metadata using a logic-rule model associated with a plurality of predetermined logic rules, wherein the logic-rule model comprises a data labeling model to assign weights to the plurality of predetermined logic rules.

Another computer implementation of the present subject matter comprises: receiving, at a campaign management server, a campaign message, retrieving metadata associated with the campaign message, wherein the metadata comprises at least one subject line and campaign name of the campaign message, generating a plurality of message components with respective content data and layout data, and determining a campaign characteristic based on the plurality of message components and the metadata using a logic-rule model associated with a plurality of predetermined logic rules, wherein the logic-rule model comprises a data labeling model to assign weights to the plurality of predetermined logic rules. According to some embodiments, the determined campaign characteristics can comprise one of campaign channels, campaign generator attributes, the design quality, targeting level or holiday theme.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which:

FIG. 3C shows exemplary content data and layout data in accordance with FIGS. 3A and 3B, according to one or more embodiments of the present subject matter;

DETAILED DESCRIPTION

Figure 1:
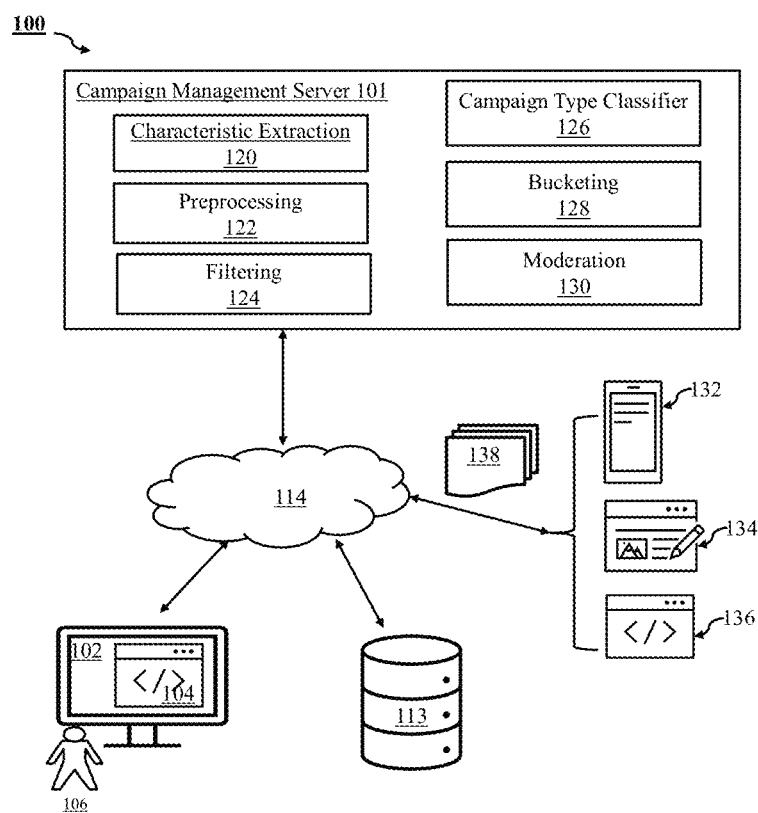
FIG. 1 shows an exemplary diagram of a campaign management system for exemplary campaign message generation and classification, according to one or more embodiments of the present subject matter.

The present subject matter pertains to improved approaches for a campaign message system. Embodiments of the present subject matter are discussed below with reference to FIGS. 1-8.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for efficiently classifying campaign messages with diversity and relevance from a large number of available messages. These can be implemented with computers that execute software instructions stored on non-transitory computer-readable media. An improved campaign message system can have one or more of the features described below.

FIG. 1A shows an exemplary diagram of a campaign message system 100 for efficiently extracting and classifying high-performing and diverse campaign messages according to the present subject matter. A campaign message can be any computer-compiled electronic message such as emails and Short Message Service (SMS) messages that can deliver relevant content to its targeted customers by a marketer or campaign generator.

Campaign management server 101 can comprise a number of modules or units to implement functions of the present subject matter. According to some embodiments, campaign management server 101 can implement functions related to message characteristics extraction 120, preprocessing 122, filtering 124, campaign type classification 126, bucketing 128 and moderation 130. Other relevant functions, such as consent flow initiation and management, message management and presentation, can also be implemented by campaign management server 101.

As shown in FIG. 1, campaign management server 101 can receive a large number of previous campaign messages 138 from its numerous campaign generators. According to some embodiments, the campaign management server 101 can extract all campaign messages that were created or sent through the server. Alternatively, the campaign management server 101 can extract all campaign messages in a fixed or preferred timeline, for example, messages sent in the past 30 days. The previous campaign messages 138 can comprise, for example, text message 132 sent to a mobile device, and marketing emails 134 and 136 sent to a computing device.

Network 114 can comprise a single network or a combination of multiple networks, such as the Internet or intranets, wireless cellular networks, local area network (LAN), wide area network (WAN), WiFi, Bluetooth, near-field communication (NFC), etc. Network 114 can comprise a mixture of private and public networks or one or more local area networks (LANs) and wide-area networks (WANs) that may be implemented by various technologies and standards.

According to some embodiments, campaign management server 101 can extract performance metrics and characteristics data of all previously sent campaign messages 138 via executing a management command. According to some embodiments, performance metrics can be related to high click-through rate or high open rate of the campaign messages. In addition, performance metrics can also comprise conversion rate or average revenue generated by the conversion. According to some embodiments, the system can define a threshold for high-performance metrics based on collected data, such as over 30% open rate, or over 2% click-through rate. According to some embodiments, different types of campaigns can be associated with different performance metrics. For example, a promotion campaign's predetermined high-performance metrics could be different from that of a blog/newsletter campaign. According to some embodiments, a weighted and hybrid performance metrics with consideration of various rates and factors, e.g., the conversion rate, the click-through rate, the open rate, the average revenue, can be adopted by the system.

According to some embodiments, campaign management server 101 can remove messages with evident metric errors. An example can be a campaign message that was sent to a small number of recipients since their performance metrics can be skewed due to excessive targeting or statistical randomness.

According to some embodiments, the characteristics comprise, for example, performance metrics, campaign types, campaign attributes, campaign generator attributes, targeting levels, campaign timings, and campaign channels.

According to some embodiments, based on its intended goal, a campaign message can be classified by campaign management server 101 as one of the following types: promotions, featured products, blogs and newsletters, and notifications. For example, promotions and featured products campaigns are created to generate revenue for the marketers, whereas blogs and newsletters campaigns aim to deliver blog/newsletter/entertainment/educational content to its audiences, and notifications campaigns are intended to deliver specific information to the audiences. These listed four types are exemplary and additional or varied message types can be adopted by the system.

According to some embodiments, the campaign type classification 126 can be implemented by a campaign type classifier that can predict any campaign message's category/type based on various data related to the message. Such data can comprise, for example, component content data and layout data, as well as metadata such as the subject line and the campaign name.

A scraper and extraction model associated with the campaign type classifier can generate content data and layout date for each component of campaign message 302. For example, the content data can comprise corresponding texts in a component. The content data can further comprise each component's type, e.g., an image component, or a text component. The layout data can describe the render location and appearance of each component, which can be used to infer the message's intent for the classification purpose, e.g., to promote a product, or to announce some news. For example, the layout data can comprise the size, position, color, visibility of a component relative to the background of a campaign message. According to some embodiments, an extraction model associated with the campaign type classifier can bulk extract objects, such as links and images, from the campaign message.

According to some embodiments, the campaign type classifier can comprise an ensemble model that comprises, for example, conventional logic-rule model(s) and machine learning language model(s), all of which are configured to independently generate a predicted campaign type. According to some embodiments, the ensemble model can comprise, for example, a number of language models configured to independently generate a predicted campaign type. According to some embodiments, the ensemble model can comprise a logic-rule model associated with a plurality of predetermined logic rules. Furthermore, the logic-rule model can comprise a data labeling model to assign weights to the plurality of predetermined logic rules.

According to some embodiments, the campaign type classifier can select a majority campaign type, i.e., the campaign type with the highest votes. According to some embodiments, the campaign type classifier can comprise a data labeling model, e.g., snorkel model, to weigh and assign importance weight to respective classification models based on the base models' previous prediction success rates.

Furthermore, when each of the predicted campaign types is different from each other or there is no majority campaign type, the system can select a classification model, e.g., a logic-rule model or a language model, as a default model for generating the campaign type. The selection of the default model can be based on the models' respective success rates of correctly predicting a message type. As an alternative, the system can also abstain from predicting a campaign type when the classification confidence is below a threshold that can be empirically predetermined or dynamically adapted.

In addition to the campaign type classification, the ensemble model can be trained to classify other message characteristics, such as campaign channels, campaign generator attributes, design quality, targeting level, holiday-related, etc. For example, the ensemble model can be trained with labeled training data for identifying messages with high-quality design elements so that it can identify and tag messages with good designs. Similarly, the ensemble model can be trained for automatically tag messages with a specific holiday theme. The ensemble model can also determine an industry type of the message, e.g., the healthcare industry, or the automobile industry, based on the content and layout data.

In addition to message classification, campaign management server 101 can preprocess the received message data, for example, to filter out non-compliant messages via preprocessing 122. According to some embodiments, the filtering rules are configured to remove non-compliant messages in this stage. A non-compliant message can be geographically specific messages, messages with incorrect performance metrics, messages with missing interest feature values, and messages with performances lower than a predetermined threshold.

For example, to avoid a foreign language or to limit the selection within one country, the filtering rules can remove messages that are not from US companies or from a specific country. The filtering rules can also remove messages with obviously incorrect performance metrics, e.g., too high, or with missing values for features of interest. The filtering rules can further remove messages that do not pass a minimal performance threshold.

Next, the filtered messages are further subjected to bucketing 128 that can segment the campaign messages into campaign peer groups and select respective exemplary campaign messages with performance metrics higher than a predetermined threshold for each campaign peer group. As the campaign messages are divided into different campaign groups, their performance data can be meaningfully compared for selecting the high-performance messages.

According to some embodiments, the segmentation characteristics for grouping the campaign messages can comprise the campaign types, the campaign generator attributes and the targeting levels. Furthermore, the campaign generator attributes can comprise industry types, e.g., apparel & accessories, automotive, electronics, and sizes of the previous campaign generators, e.g., 5-20 employees, or over 100 employees. In addition, other characteristics can be used to divide the messages into different campaign groups.

Furthermore, besides the performance metrics, other factors such as varieties of the industry types, sizes of the campaign generators can also be considered in selecting the campaign messages. This way, any prospective campaign generator can find relevant and engaging showcase messages that share similar traits with the generator. For example, a small company with less than 10 employees in the healthcare industry can view messages that have been proven successful for a similar company in the healthcare industry.

According to some embodiments, campaign management server 101 can adopt a number of parameters to determine the output of the bucketing process. For example, such parameters can define the percentage of kept messages per peer group/bucket, the minimum and/or maximum number of kept emails per peer group. Furthermore, setting the maximum number of kept messages can avoid excessive message volume from the largest peer groups. In addition, the parameters can define the minimum number of kept messages to avoid skipping messages from the smaller peer group. As such, different sized bucket or campaign group can have different parameter rules.

For example, when a campaign segmentation group has less than 10 campaign messages, the system can keep all of them as exemplary messages. When the group has 10-100 campaign messages, the system can keep the top 10 messages with the best performance metrics. When the group has 100-4000 campaign messages, the system can keep the top 10% performance messages. When the group has over 4000 campaign messages, the system can keep the top 400 messages in performance metrics and disregard the rest.

To generate a diversified and balanced campaign message collection, different campaign groups can have different performance thresholds. According to some embodiments, the system can adopt a respective performance threshold for each campaign group. For example, a small campaign group can have a low-performance threshold, whereas a large campaign group can have a high-performance threshold. Furthermore, the threshold values can be empirically predetermined or dynamically adapted. According to some embodiments, the selected exemplary campaign messages are ranked in ascending order according to the performance metrics.

In addition, according to some embodiments, campaign management server 101 can avoid selecting multiple campaign messages from the same campaign generator so that it does not send numerous consent requests to one campaign generator.

According to some embodiments, campaign management server 101 can further filter or remove unsupported campaign messages from the selected exemplary campaign messages via filtering 124. One goal of the filtering process is to reduce the number of messages for further moderation or manual review. Examples of such unsupported campaign messages can be GIF-based messages, or whether the system can reach the previous campaign generator to obtain the consent to display.

According to some embodiments, campaign management server 101 can enable a manual review and moderation of the remaining selected campaign messages via moderation 130 by a curator. To make the review more efficient, the system can automatically generate a screenshot image of the campaign message. Additional information such as the message's subject line, the preview text, is also available for the curator.

For additional sorting, ranking and management of the messages, the curator can assign a number of tags to the reviewed messages. Examples of such tags can comprise a campaign type, a discount code, a holiday, an industry type, a marketing channel, or a design quality grade. According to some embodiments, instead of a manual review, a moderation model can be trained to review and tag the selected campaign messages. For example, a moderation model that has been trained with messages with discount tags can automatically assign a discount code to a new message. The output of the moderation process can be a list of the selected campaign messages with assigned tags, which can be further saved as JSON (JavaScript Object Notation) data structures in database 113.

According to some embodiments, for each campaign message candidate, the system can initiate a consent process to obtain the previous campaign generator's consent for displaying the message. Upon receiving the consent to display or showcase, the selected and approved exemplary campaign messages can be organized and displayed to a new campaign generator 106. Furthermore, the system can generate images 104 of these campaign messages for displaying on a client device 102.

Figure 2A:
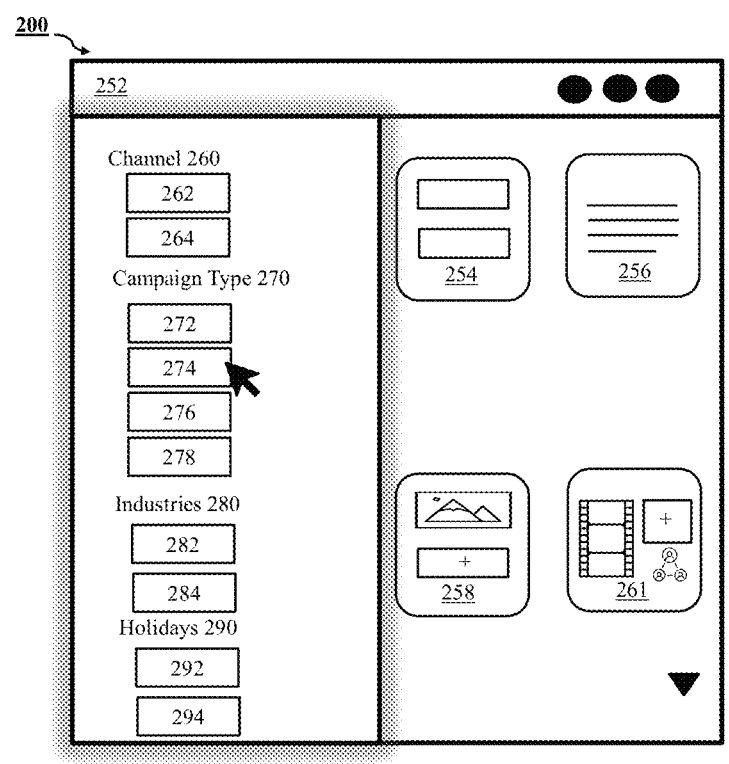
FIG. 2A shows an exemplary display of the exemplary campaign messages to a campaign generator, according to one or more embodiments of the present subject matter.

FIG. 2A shows an exemplary display 200 of the exemplary campaign messages to a campaign generator or a user. A campaign generator can view the exemplary campaign messages via a display 252 of a client device. As shown in FIG. 2A, the campaign generator can provide sorting input to select and view the most relevant showcase campaign messages. For example, various sorting inputs can comprise marketing channel 260, campaign type 270, industries 280, holidays 290, as well as other factors such as performance metrics and discounts.

According to some embodiments, marketing channel 260 can comprise an SMS message 262 and an email message 264. Campaign type 270 can comprise a newsletter 272, notifications 274, product announcements 276, and promotions 278. Industries 280 can comprise a number of industry types such as apparel & accessories 282, automotive 284, etc. Furthermore, holidays 290 can comprise a listing of consecutive months, e.g., January 292 and February 294. As an alternative, holidays 290 can comprise a list of specific holidays or foreign holidays e.g., Labor Day, Thanksgiving, Earth Day, Canada Day, etc.

Upon receiving the sorting input, the system can generate relevant and updated exemplary campaign messages and display the updated campaign messages such as email messages 254, 258 and 261, and text message 256 on display 252, in a browsable image grid.

Figure 2B:
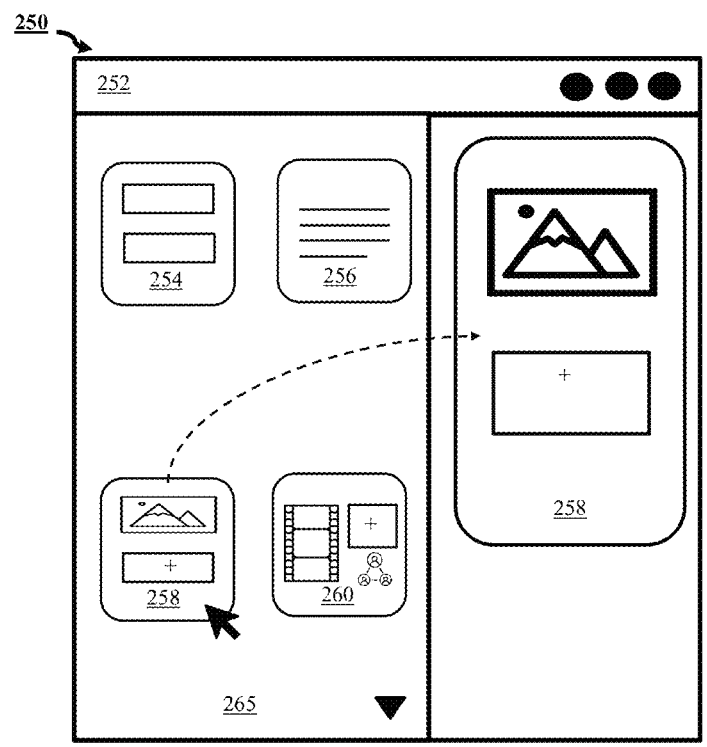
FIG. 2B shows another exemplary display of the exemplary campaign messages to the campaign generator, according to one or more embodiments of the present subject matter.

FIG. 2B shows another exemplary display 250 of the exemplary campaign messages to the campaign generator. A campaign generator can click an email message 258 to initiate a full view. In addition, more characteristic information related to email message 258 can be displayed upon clicking. For example, the system can display the subject line, preview text, and assigned tags of email message 258.

According to some embodiments, the system can update shown exemplary campaign messages at a predetermined interval, e.g., every 24 hours, for the same prospective campaign generator. This way, the system can constantly provide fresh inspiration to the campaign generator or user.

Figure 3A:
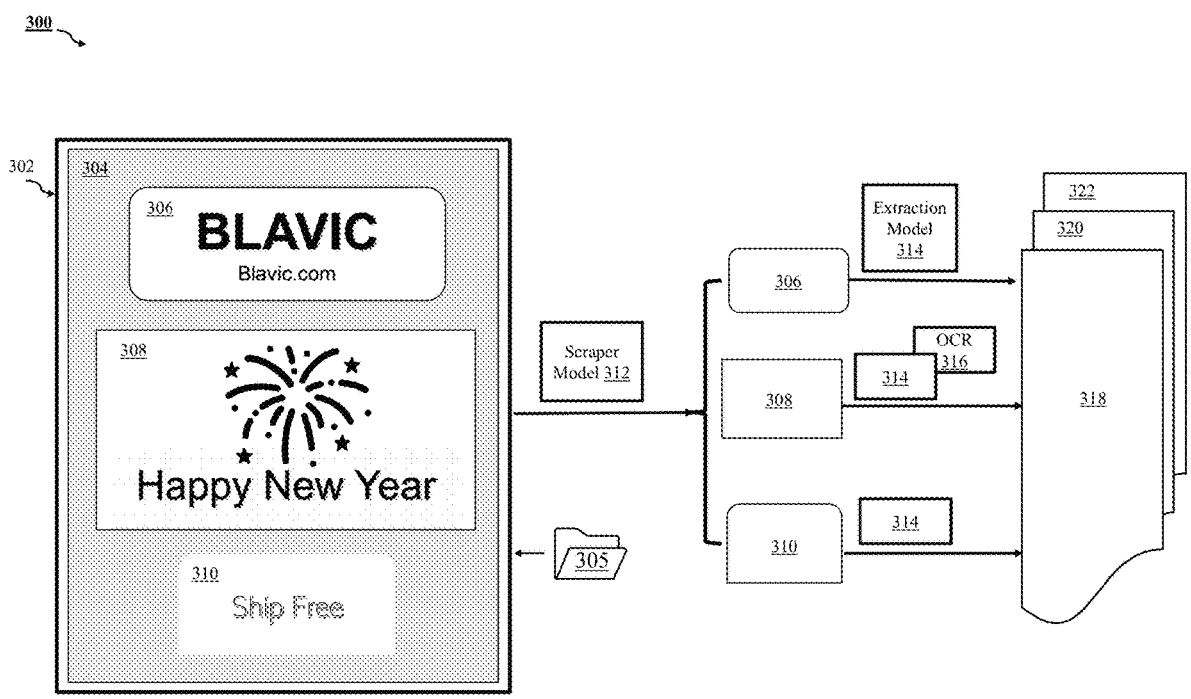
FIG. 3A shows exemplary scraping and preprocessing processes for campaign messages classification, according to one or more embodiments of the present subject matter.

FIG. 3A shows exemplary scraping and preprocessing processes 300 for campaign messages classification. As shown in the figure, a campaign message 302 can be a holiday-themed email message received by the campaign-message system. Campaign message 302 can comprise various types of message components or blocks, such as link component 306, image component 308 and text component 310. Other types of components such as video component, button component can also be adopted. According to some embodiments, campaign message 302 can comprise metadata 305 such as the subject line, e.g., "Happy New year from Us", and campaign name, e.g., "New Year Promo." Other metadata, such as the message creation time, or campaign generator's information, can also be utilized. According to some embodiments, campaign message 302 can be a mobile text message that can be similarly processed and classified by the system.

A scraper model 312 and an extraction model 314 can be configured to identify and generate content data and layout date for each component of campaign message 302. An example of a scraper model can be a HTML scraper such as BeautifulSoup4. The extraction model 314 can bulk extract objects, ush as links and images, from components 306, 308 and 310. An example of extraction model 314 can be Selenium Webdriver. In this example, the content data can comprise corresponding texts, e.g., "Blavic", "Happy New Year", "Ship Free" in each component. In addition, to generate the content data, the system can further adopt an OCR (Optical Character Recognition) model 316 to identify and extract texts/letters from image component 308 or other non-editable components. The content data can further comprise each component's type, e.g., component 306 includes a hyperlink and component 308 includes an image. The generated layout data can describe the render location and appearance of each component, which can be used to infer the message's intent for the classification purpose. For example, the layout data can comprise the size, position, color, visibility of a component relative to the background 304 of campaign message 302.

As shown in FIG. 3A, the scraping and preprocessing processes can generate first content and layout data 318 corresponding to link component 306, second content and layout data 320 corresponding to image component 308, and third content and layout data 322 corresponding to text component 310, which can be further processed in the following classification stage.

Figure 3B:
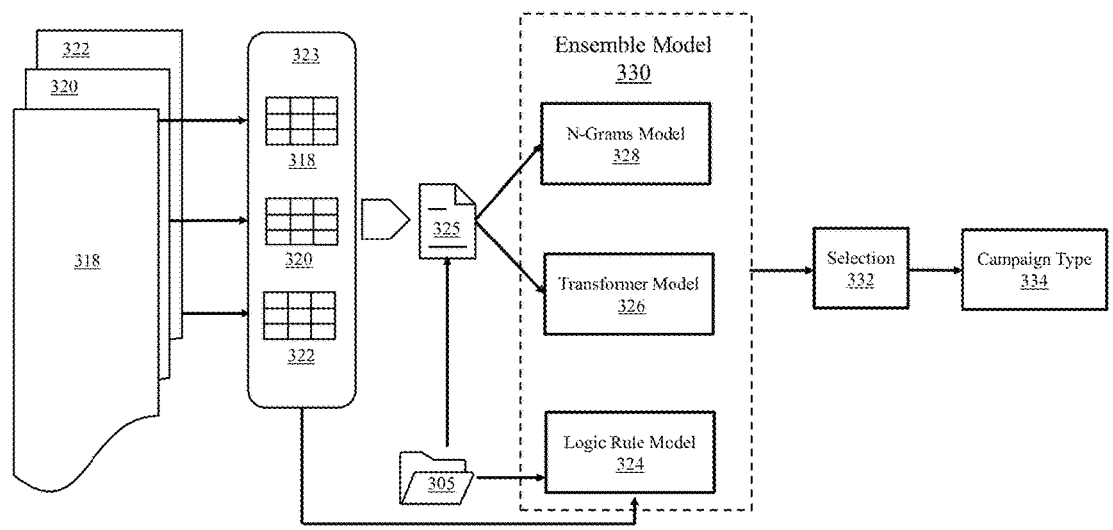
FIG. 3B shows exemplary classification processes following FIG. 3A, according to one or more embodiments of the present subject matter.

FIG. 3B shows exemplary classification processes 350 following FIG. 3A. According to some embodiments, the comprehensive content and layout data 323 of campaign message 302, can comprise first content and layout data 318, second content and layout data 320, and third content and layout data 322.

Pursuant to a list of prediction rules, a logic-rule model 324 can predict a number of campaign types based on the comprehensive content and layout data 323 and metadata 305. A logic-rule model is a non-trainable model based on the list of prediction rules. A prediction rule can define a keyword or regular expression, i.e., content data, associating with a location, i.e., layout data, in accordance with a specific campaign type. For example, a first prediction rule can define that a campaign message has a keyword of "saving" or "save" located anywhere should be classified as a promotion-type message. In addition, a campaign message has a keyword of "discount" located in a text or image component can be categorized as a promotion-type message. Similarly, a campaign message has a keyword of "price drop" located in the subject line and/or the campaign name, i.e., metadata, can be a promotion-type message. For example, a second prediction rule can define that a campaign message has a keyword of "news" or "update" located in the subject line and/or the campaign name can be a notification-type message. In addition, a prediction rule can define the color, size, and visibility of a component in accordance with a predicted campaign type.

According to some embodiments, when the list of prediction rules generates different campaign types for a message, the system can adopt a data labeling model, e.g., snorkel model, to weigh and assign importance weight to respective prediction rules. Furthermore, the data labeling model can be trained with labeled datasets for assigning importance weights to each prediction rule or its result.

Furthermore, the logic-rule model 324 can abstain from making a prediction when classification confidence is below a threshold. Furthermore, the threshold values can be empirically predetermined or dynamically adapted. According to some embodiments, the system can choose the majority campaign type as the output campaign type from logic-rule model 324.

Ensemble modeling can adopt diverse models to predict an outcome by using different modeling algorithms. According to some embodiments, an ensemble model 330 can comprise the logic-rule model 324, transformer model 326 and N-grams model 328, to generate a list of predicted campaign types. A transformer model is a deep learning model that can adopt the mechanism of self-attention for differentially weighting the significance of each part of the input data. Furthermore, a transformer model can comprise an encoder-decoder architecture. An N-gram language model can predict the probability of a given N-gram within any sequence of words in the language. According to some embodiments, additional base models, e.g., a third or fourth language model, can be utilized by the system. The ensemble model 330 can aggregate the prediction of each base model and generate one prediction for the campaign message's type.

As shown in FIG. 3B, metadata 305 and comprehensive content and layout data 323 can be translated into a series of textual representations 325, which can be subject to a feature extraction process by machine learning models such as transformer model 326 and N-grams model 328. The feature extraction process can transform raw textual representations 325 into feature vectors, i.e., numerical features or embeddings representing the original information in the data set.

According to some embodiments, the generated feature vectors can be processed by Support Vector Machine (SVM) models to determine a respective campaign type for each language model. For example, the SVM model can use classification algorithms for two-group classification. After being trained with labeled datasets, the SVM model can classify the text representations 325 into a predicted campaign type.

Upon receiving the list of predicted campaign types, via a selection process 332, the system can select a majority campaign type as the determined campaign type 334. According to some embodiments, the selection process 332 can select the campaign with the highest votes. According to some embodiments, the selection process 332 can comprise a data labeling model, e.g., snorkel model, to weigh and assign importance weight to respective models and campaign types based on the base models' previous prediction success rates.

According to some embodiments, when each of the predicted campaign types is different from each other or there is no majority campaign type, the system can select a base model, e.g., logic-rule model 324, as a default model for the determined campaign type 334. As an alternative, the system can also abstain from predicting the determined campaign type 334 when the classification confidence is below a threshold, either predetermined or dynamically adjusted.

FIG. 3C shows exemplary content data and layout data 370 in accordance with FIGS. 3A and 3B. As shown in the earlier figures, a scraper model 312 can generate content data and layout date for each component of campaign message 302. For example, first content and layout data 318 can comprise content data such as text "BLAVIC", type "Link," and layout data such as width, height, top, left and visibility. Similarly, second and third content and layout data 320, 322 can comprise content data such as text data "Happy New Year" and corresponding layout data including the position and visibility information.

According to some embodiments, the extracted layout data can describe the render location and appearance of each component, which can be used to infer the intent of the message for the classification. Visibility of a component can be measured by the relative design differences, e.g., color, transparency, between the component and the message background. For example, a large sized text content located in the center with high visibility can be associated with high importance for its intended purpose, e.g., promotion. On the contrary, a small font text or image located close to the bottom can be associated with low priority and assigned with a lower priority for the classification purpose.

Figure 4:
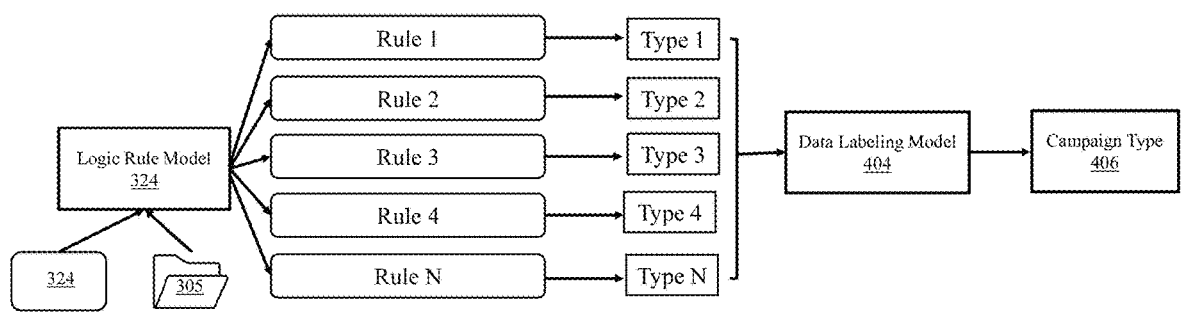
FIG. 4 shows exemplary processes for campaign messages classification using logic-rule model(s), according to one or more embodiments of the present subject matter.

FIG. 4 shows exemplary processes 400 for campaign messages classification using logic-rule model(s) with a number of predetermined prediction rules. According to some embodiments, a prediction rule can define a keyword or regular expression (regex) and/or a location associated with it in accordance with a specific campaign type. For example, a first prediction rule can define that a campaign message has a keyword of "saving" or "save" located anywhere should be classified as a promotion-type message. In addition, a campaign message has a keyword of "discount" located in a text or image component can be categorized as a promotion-type message. Similarly, a campaign message has a keyword of "price drop" located in the subject line and/or the campaign name, i.e., metadata, can be a promotion-type message. For example, a second prediction rule can define that a campaign message has a keyword of "news" or "update" located in the subject line and/or the campaign name can be a notification-type message.

As shown in FIG. 4, pursuant to a list of prediction rules such as rule 1, rule 2 and rule N, a logic-rule model 324 can predict a number of corresponding campaign types based on the comprehensive content and layout data 323 and metadata 305. For example, according to rule 1, logic-rule model 324 can predict type 1 as the campaign type; according to rule 2, the model can predict type 2 as the campaign type, etc. According to some embodiments, the system can choose the majority campaign type as the output campaign type 406 from logic-rule model 324.

According to some embodiments, when the list of prediction rules generates different or conflicting campaign types for a message, the system can adopt a data labeling model, e.g., snorkel model 404, to weigh and assign importance weight to respective prediction rules. As such, the system can opt for a campaign type with the highest aggregated weights. Furthermore, the logic-rule model 324 can abstain from making a prediction when classification confidence is below a threshold.

Figure 5:
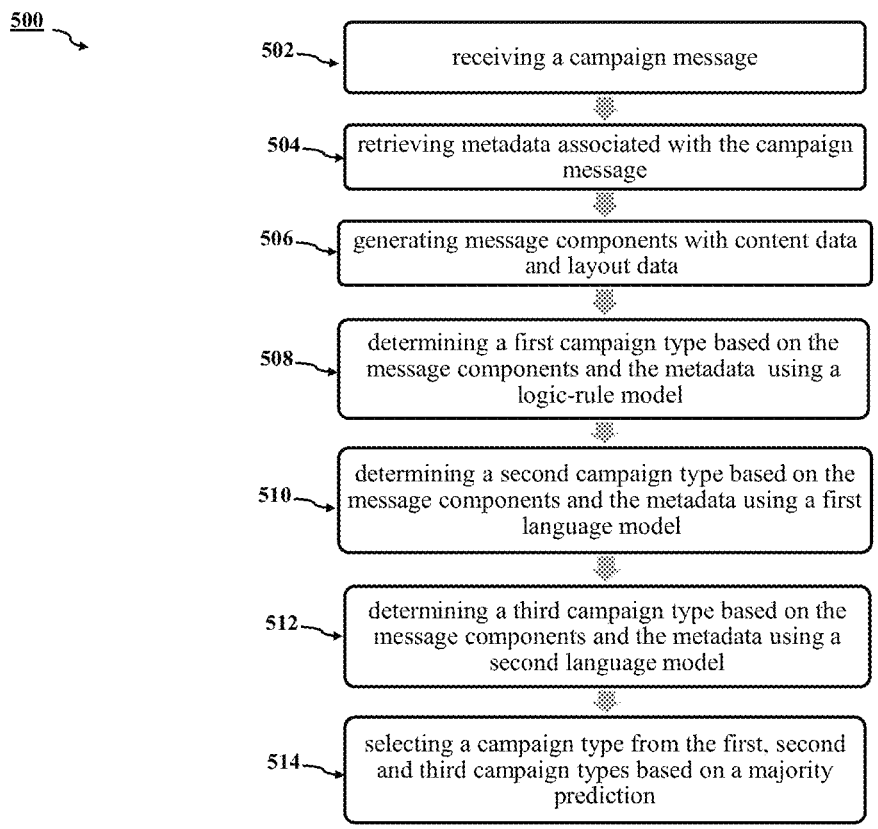
FIG. 5 shows some exemplary processes for campaign messages classification, according to one or more embodiments of the present subject matter.

FIG. 5 shows some exemplary processes 500 for campaign message classification. At step 502, the campaign message system can receive a campaign message from a campaign generator. The campaign message can be one of several predetermined campaign types, such as promotions, featured products, blogs and newsletters, and notifications. For example, promotions and featured products campaigns are created to generate revenue for the marketers. In addition, additional or varied message types can be adopted by the system.

At step 504, the campaign message system can retrieve metadata associated with the campaign message. According to some embodiments, the metadata comprises at least one subject line and campaign name of the campaign message. Various additional metadata, such as the message creation time, or campaign generator's information, can also be retrieved and utilized.

At step 506, the campaign message system can generate a number of message components with respective content data and layout data. The content data can comprise corresponding texts in a component. The content data can further comprise each component's type, e.g., an image component, or a text component. The layout data can describe the render location and appearance of each component, which can be used to infer the importance of the component for the classification purpose. For example, the layout data can comprise the size, position, color, visibility of a component relative to the background of a campaign message. According to some embodiments, a scraper model and an extraction model can extract the respective layout data and content data of the message components.

At step 508, the campaign message system can determine a first campaign type based on the message components and the metadata using a logic-rule model. A logic-rule model can predict a number of campaign types based on the content and layout data using a list of prediction rules. A logic-rule model is a non-trainable model based on the list of prediction rules. A prediction rule can define a keyword or regular expression, i.e., content data, associating with a location, i.e., layout data, in accordance with a specific campaign type.

According to some embodiments, when the list of prediction rules generates different campaign types for a message, the system can adopt a snorkel model to weigh and assign importance weight to respective prediction rules. Furthermore, the snorkel model can be trained with labeled datasets for assigning importance weights to each prediction rule or its result.

Furthermore, the logic-rule model can abstain from making a prediction when classification confidence is below a threshold. Furthermore, the threshold values can be empirically predetermined or dynamically adapted.

At step 510, the campaign message system can determine a second campaign type based on the message components and the metadata using a first language model. At step 512, the campaign message system can determine a third campaign type based on the plurality of message components and the metadata using a second language model. According to some embodiments, an ensemble model can additionally comprise a transformer model and an N-grams model, to generate a list of predicted campaign types. At step 514, the ensemble model can aggregate the prediction of each base model and generate one prediction for the campaign message's type.

To generate the predicted campaign types, metadata and comprehensive content/layout data can be translated into a series of textual representations, which can be subject to a feature extraction process by the transformer model and an N-grams model. The feature extraction process can transform raw textual representations into feature vectors. According to some embodiments, additional base models, e.g., a third or fourth language model, can be utilized by the system. According to some embodiments, the generated feature vectors can be processed by SVM models to determine a respective campaign type for each language model.

At step 515, the campaign message system can determine a campaign type from the first, second and third campaign types based on a majority prediction. According to some embodiments, the system can select a majority campaign type, i.e., the campaign type with the highest votes. According to some embodiments, the system can comprise a data labeling model, e.g., snorkel model, to weigh and assign importance weight to respective classification models.

Figure 6:
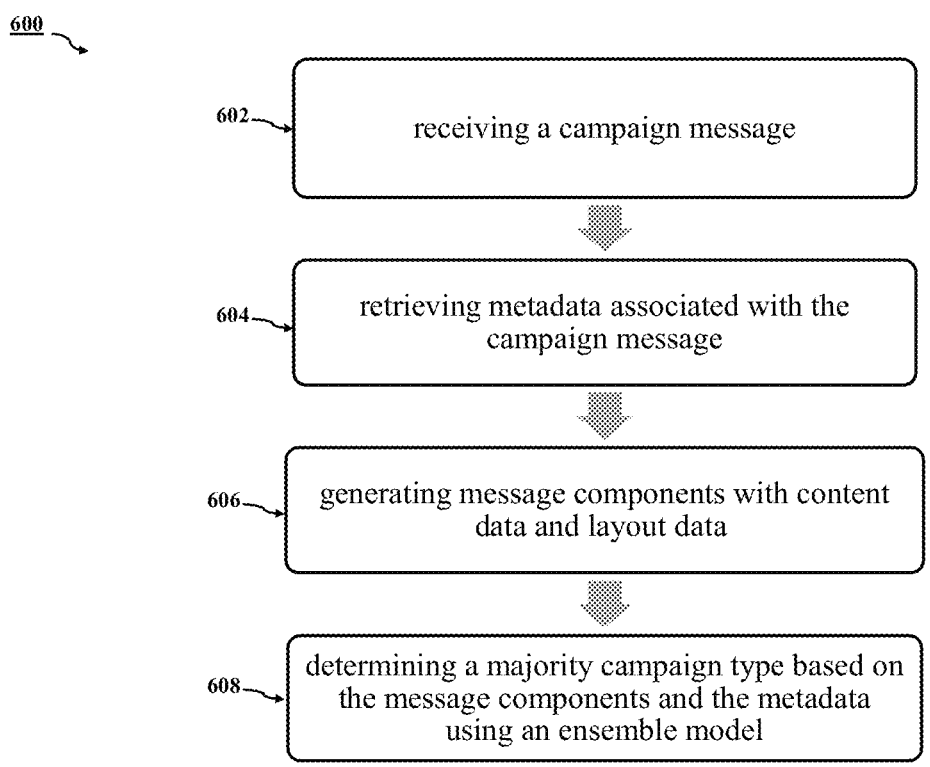
FIG. 6 shows some exemplary processes for campaign messages classification, according to one or more embodiments of the present subject matter.

FIG. 6 shows some exemplary processes 600 for campaign message classification. At step 602, the campaign message system can receive a campaign message from a campaign generator. At step 604, the campaign message system can retrieve metadata associated with the campaign message. According to some embodiments, the metadata comprises at least one subject line and campaign name of the campaign message. At step 606, the campaign message system can generate a plurality of message components with respective content data and layout data.

At step 608, the campaign message system can determine a majority campaign type based on the plurality of message components and the metadata using an ensemble model, wherein the ensemble model comprises one or more of a logic-rule model, a first language model and a second language model configured to independently generate a respective campaign type.

In addition to the campaign type classification, the campaign message system can classify other characteristic classification, such as campaign channels, campaign generator attributes, design quality, targeting level, holiday-related, etc. For example, the ensemble model can be trained with labeled training data for identifying messages with high-quality design elements so that it can identify and tag messages with good designs. Similarly, the ensemble model can be trained for automatically tag messages with a specific holiday theme.

The system can dynamically select and showcase high-performance campaign messages with consideration for the messages' relevance, diversity, and breath. As such, these showcase exemplary messages can represent a broad range of successful marketing campaigns, which can be used to inspire and teach other campaigns that share similar traits and preferences with the previous campaigns.

Via an automated process, the system can generate a browsable collection of diverse, high-performing campaign messages, e.g., emails and SMS messages, that can prompt a user or a prospective campaign generator to create quality content for his/her own campaigns. Furthermore, varied exemplary campaigns can be shown to different users in response to his/her unique needs or expressed interests.

As disclosed in the present subject matter, the campaign message system can continuously extract performance metrics and data of all previously sent campaign messages. The system can preprocess the received message data, for example, to filter out non-compliant messages. The resulted messages are further subjected to a bucketing process that can segment the campaign messages into campaign peer groups and select respective campaign messages with performance metrics higher than a predetermined threshold. As the campaign messages are divided into different campaign groups, their performance data can be meaningfully compared for selecting the high-performance messages. Furthermore, to generate a diverse campaign message collection suitable for different campaign generators, the system can adopt a respective performance threshold for each respective campaign group.

Next, the system can remove unsupported campaign messages from the automatically generated campaign messages and, if needed, enable a manual review and moderation of the remaining messages. During the moderation process, a curator can remove inappropriate messages or poor design-quality messages. Furthermore, for each approved message, the curator can assign multiple tags, such as a campaign type, a discount code, a holiday, an industry type, a marketing channel, or a design quality grade, to facilitate the management and post-processing of the selected messages. According to some embodiments, instead of or in addition to a manual review, a moderation model can be trained to review and tag the selected campaign messages. For example, a moderation model that has been trained with messages with discount tags can automatically assign a discount code to a new message.

Furthermore, the system can initiate a consent process to obtain the previous campaign generator's consent. Upon receiving the consent to display or showcase, the selected and approved campaign messages can be displayed to a prospective campaign generator for creative inspiration.

During this process, the system can adopt a campaign type classifier to predicate any campaign message's category based on various data related to the message. Such data can comprise content components with layout data as well as metadata such as the subject line and the campaign name. The campaign type classifier can be an ensemble model that comprises at least a logic-rule model, a first language model, and a second language model configured to independently generate a predicted campaign type.

In addition, the system can rank, organize and present the selected campaign messages to showcase diversified campaign examples that have delivered excellent outcomes and matched the user's expressed interest or preference. Such sorting and displaying can be based on the assigned tags such as a campaign type, a discount code, a holiday tag, an industry tag, a quality-design tag, and a marketing channel tag. In particular, the system can selectively divide, merge and rank the campaign messages based on the assigned tags as well as other characteristic data of the messages.

Furthermore, the system can dynamically update and refresh the displayed campaign messages to the same user or marketer. For example, the prospective marketer can view different campaign messages every 24 hours, or at a specific interval predetermined by the system.

As such, the system can generate an expansive and growing list of relevant, diverse, and high-performing campaign messages to inspire a campaign generator to create engaging content of his/her own.

Figure 7A:
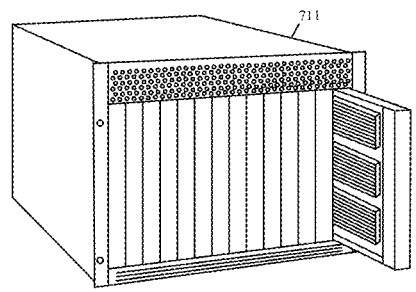
FIG. 7A shows a server system of rack-mounted blades, according to one or more embodiments of the present subject matter.

FIG. 7A shows a server system of rack-mounted blades for implementing the present subject matter. Various examples are implemented with cloud servers, such as ones implemented by data centers with rack-mounted server blades. FIG. 7A shows a rack-mounted server blade multi-processor server system 711. Server system 711 comprises a multiplicity of network-connected computer processors that run software in parallel.

Figure 7B:
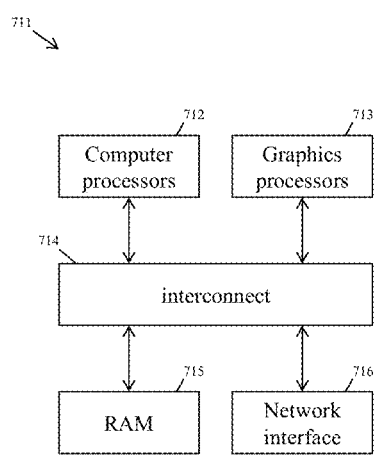
FIG. 7B shows a diagram of a networked data center server, according to one or more embodiments of the present subject matter.

FIG. 7B shows a diagram of a server system 711. It comprises a multicore cluster of computer processors (CPU) 712 and a multicore cluster of graphics processors (GPU) 713. The processors connect through a board-level interconnect 714 to random-access memory (RAM) devices 715 for program code and data storage. Server system 711 also comprises a network interface 716 to allow the processors to access the Internet, non-volatile storage, and input/output interfaces. By executing instructions stored in RAM devices 715, the CPUs 712 and GPUs 713 perform steps of methods described herein.

Figure 8A:
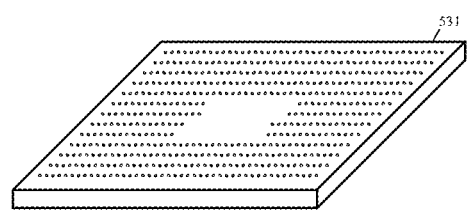
FIG. 8A shows a packaged system-on-chip device, according to one or more embodiments of the present subject matter.

FIG. 8A shows the bottom side of a packaged system-on-chip device 831 with a ball grid array for surface-mount soldering to a printed circuit board. Various package shapes and sizes are possible for various chip implementations. System-on-chip (SoC) devices control many embedded systems, IoT device, mobile, portable, and wireless implementations.

Figure 8B:
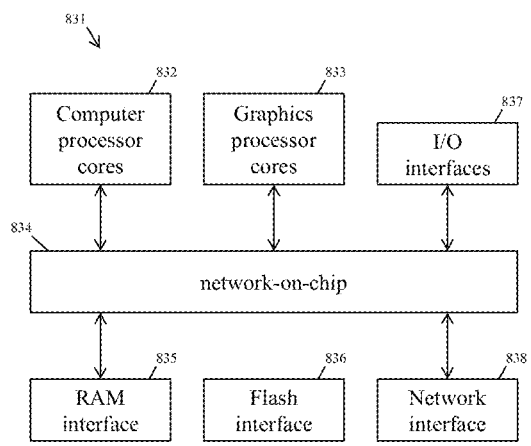
FIG. 8B shows a block diagram of a system-on-chip, according to one or more embodiments of the present subject matter.

FIG. 8B shows a block diagram of the system-on-chip 831. It comprises a multicore cluster of computer processor (CPU) cores 832 and a multicore cluster of graphics processor (GPU) cores 833. The processors connect through a network-on-chip 834 to an off-chip dynamic random access memory (DRAM) interface 835 for volatile program and data storage and a Flash interface 836 for non-volatile storage of computer program code in a Flash RAM non-transitory computer readable medium. SoC 831 also has a display interface for displaying a graphical user interface (GUI) and an I/O interface module 837 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 831 also comprises a network interface 838 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 835 or Flash devices through interface 836, the CPU cores 832 and GPU cores 833 perform functionality as described herein.

Examples shown and described use certain spoken languages. Various embodiments work, similarly, for other languages or combinations of languages. Examples shown and described use certain domains of knowledge and capabilities. Various systems work similarly for other domains or combinations of domains.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Several aspects of implementations and their applications are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method of predicting a campaign type, the method comprising:
receiving, at a campaign management server, a campaign message;
detecting, by a geolocation receiver of a client device, geolocation information of the client device;
filtering out non-compliant messages based on the geolocation information;
retrieving metadata associated with the campaign message, wherein the metadata comprises at least one subject line and campaign name of the campaign message;
generating, using a scraper model, layout data by extracting size, location, and visibility data of image or text components of a plurality of message components in the campaign messages;
generating, by an extraction model, content data by extracting texts of images of the campaign messages;
conducting feature extraction based on the metadata and the content data to generate feature vectors;
determining a first campaign type based on the layout data and the feature vectors using a logic-rule model;
determining a second campaign type based on the layout data and the feature vectors using a first language model;
determining a third campaign type based on the layout data and the feature vectors using a second language model;
receiving performance predictions for a plurality of previously sent campaign messages by each of the logic-rule model, the first language model and the second language model;
detecting, by a plurality of client devices, actual performance metrics associated with the plurality of previously sent campaign messages, wherein the actual performance metrics comprise at least one of a click-through rate or an open rate of the campaign messages on the plurality of client devices;
determining each model's previous prediction success rates based on the received performance predictions and the actual performance metrics;
determining, by a data modeling model, respective importance weight for each of the logic-rule model, the first language model and the second language model based on each model's previous prediction success rates;
assigning, by the data modeling model, the respective importance weight to the logic-rule model, the first language model and the second language model;
selecting a campaign type from the first, second and third campaign types with highest importance weight; and
displaying the campaign message based on the selected campaign type to a prospective campaign generator.

2. The computer-implemented method of claim 1, further comprising:
determining, via the logic-rule model, the first campaign type based on a plurality of predetermined logic rules.

3. The computer-implemented method of claim 2, wherein the logic-rule model further comprises a data labeling model to assign weights to the plurality of predetermined logic rules.

4. The computer-implemented method of claim 1, wherein the first language model is a transformer encoder model, and the second language model is a N-gram model.

5. The computer-implemented method of claim 4, further comprising:
converting the content data and the metadata into a series of textual representations.

6. The computer-implemented method of claim 1, wherein the first language model and the second language model are further associated with a Support Vector Machine model for determining the second campaign type and the third campaign type.

7. The computer-implemented method of claim 1, further comprising:
determining each of the first campaign type, the second campaign type and the third campaign type is different from each other;
selecting a default model from the logic-rule model, the first language model and the second language model; and
selecting the campaign type from the default model for the campaign message.

8. The computer-implemented method of claim 1, further comprising:
receiving, at the campaign management server, a plurality of campaign messages in addition to the received campaign message;
selecting, campaign messages associated with performance metrics higher than a predetermined respective threshold.

9. The computer-implemented method of claim 1, further comprising:
generating a logic-rule model based on a plurality of predetermined logic rules.

10. The computer-implemented method of claim 1, further comprising:
determining, using an ensemble model, a campaign channel of the campaign message, wherein the ensemble model comprises one or more logic-rule models or language models.

11. The computer-implemented method of claim 1, wherein the extraction model further comprises an Optical Character Recognition (OCR) model to generate the content data.

12. A computer-implemented method of predicting a campaign type, the method comprising:
receiving, at a campaign management server, a campaign message;
detecting, by a geolocation receiver of a client device, geolocation information of the client device;
filtering out non-compliant messages based on the geolocation information;
retrieving metadata associated with the campaign message, wherein the metadata comprises at least one subject line and campaign name of the campaign message;
generating, using a scraper model, layout data by extracting size, location, and visibility data of image or text components of a plurality of message components in the campaign messages;
generating, using an extraction model, content data by extracting texts of images of the campaign messages;
conducting feature extraction based on the metadata and the content data to generate feature vectors;
determining a first campaign type based on the layout data and the feature vectors using a logic-rule model;

determining a second campaign type based on the layout data and the feature vectors using a first language model;

determining a third campaign type based on the layout data and the feature vectors using a second language model;

receiving performance predictions for a plurality of previously sent campaign messages by each of the logic-rule model, the first language model and the second language model;

detecting, by a plurality of client devices, actual performance metrics associated with the plurality of previously sent campaign messages, wherein the actual performance metrics comprise at least one of a click-through rate or an open rate of the campaign messages on the plurality of client devices;

determining each model's previous prediction success rates based on the received performance predictions and the actual performance metrics;

determining, by a data modeling model, respective importance weight for each of the logic-rule model, the first language model and the second language model based on each model's previous prediction success rates;

assigning, by the data modeling model, the respective importance weight to the logic-rule model, the first language model and the second language model;

determining a majority campaign type with the highest importance weight using an ensemble model, wherein the ensemble model comprises the logic-rule model, the first language model and the second language model configured to independently generate a respective campaign type; and displaying the campaign message to a prospective campaign generator based on the majority campaign type.

13. The computer-implemented method of claim 12, further comprising:

converting the content data and the metadata into a series of textual representations.

14. The computer-implemented method of claim 12, wherein the first language model and the second language model are further associated with a Support Vector Machine model for determining the respective campaign type.

15. The computer-implemented method of claim 12, further comprising:

determining that the ensemble model does not produce the majority campaign type; and selecting a default model for generating the majority campaign type.

16. The computer-implemented method of claim 12, wherein the first language model and the second language model are further associated with a Support Vector Machine model for determining the second campaign type and the third campaign type.

17. The computer-implemented method of claim 12, further comprising:

converting the content data and the metadata into a series of textual representations.

18. The computer-implemented method of claim 12, further comprising:

selecting, for each of a plurality of campaign types, campaign messages associated with performance metrics higher than a predetermined threshold.

19. The computer-implemented method of claim 12, further comprising:

generating a logic-rule model based on a plurality of predetermined logic rules.

20. The computer-implemented method of claim 12, further comprising:

determining, using an ensemble model, a campaign channel of the campaign message, wherein the ensemble model comprises one or more logic-rule models or language models.

* * * * *